(12) United States Patent
Kosaka

(10) Patent No.: US 7,644,299 B2
(45) Date of Patent: Jan. 5, 2010

(54) FAULT TOLERANT SECURITY SYSTEM, METHOD AND APPARATUS

(75) Inventor: Mas Kosaka, Torrance, CA (US)

(73) Assignee: Proprietary Controls Systems Corporation, Torrance, CA (US)

( * ) Notice: Subject to any disclaimer, the term of this patent is extended or adjusted under 35 U.S.C. 154(b) by 430 days.

(21) Appl. No.: 11/713,342

(22) Filed: Mar. 2, 2007

(65) Prior Publication Data

US 2008/0216156 A1 Sep. 4, 2008

(51) Int. Cl.
*G06F 11/00* (2006.01)
(52) U.S. Cl. .................. 714/4; 705/18; 902/4; 902/5; 902/3
(58) Field of Classification Search .............. 705/18; 902/3, 4, 5
See application file for complete search history.

(56) References Cited

U.S. PATENT DOCUMENTS

| | | | | |
|---|---|---|---|---|
| 5,872,904 | A * | 2/1999 | McMillen et al. | 714/4 |
| 6,535,991 | B1 * | 3/2003 | Gallant et al. | 714/4 |
| 7,191,357 | B2 * | 3/2007 | Holland et al. | 714/5 |
| 7,197,660 | B1 * | 3/2007 | Liu et al. | 714/4 |
| 2004/0230488 | A1 * | 11/2004 | Beenau et al. | 705/18 |
| 2006/0075488 | A1 * | 4/2006 | Barrett et al. | 726/22 |
| 2006/0247933 | A1 * | 11/2006 | Novack et al. | 704/273 |
| 2006/0259811 | A1 * | 11/2006 | Novick | 714/5 |
| 2009/0037763 | A1 * | 2/2009 | Adhya et al. | 714/4 |

* cited by examiner

*Primary Examiner*—Christopher S McCarthy
(74) *Attorney, Agent, or Firm*—Koppel, Patrick, Heybl & Dawson; Michael J. Ram

(57) ABSTRACT

A security system comprises a host system, a plurality of master controllers and a plurality of sub-controllers, wherein each sub-controller is assigned a specific master controller as well as alternate master controllers for communication access upon failure of the primary master controller. The host, master controller and sub-controllers are all coupled by a series of primary communication networks and paths and have multiple alternative communication network paths which function should there be a failure of the primary communication network. The host system comprises system and application software, data storage devices and communication ports to support the application requirements of the master controller, sub-controller network and access control devices attached thereto necessary to support a fault tolerant network. The system is configured with backup communication networks between the components so that upon failure of one or more components or communication paths the function of the failed component or path is assumed by alternative predesignated components or paths such that the operations of the system is not interrupted.

9 Claims, 7 Drawing Sheets

FAULT TOLERANT SECURITY SYSTEM, METHOD AND APPARATUS

This invention is directed to a fault tolerant security system, method and apparatus. More specifically, embodiments of this invention are directed to a system and apparatus that is configured to dynamically route communications to alternate transmission paths upon a communication failure in the main communication path and to maintain the security status irrespective of a component or communication failure in the system.

BACKGROUND

Security systems that are designed to create a barrier against unauthorized persons entering dwellings or enclosed areas such as, homes, offices, places of business, fenced properties and the like are common. The typical security systems architectures are referred to as stand alone systems, some times also referred to as off-line systems, and host-based, real time systems. Stand alone systems provide access decisions via, a self contained electrical or electronic control module with connected to a data entry device. host-based, real time systems Typical data entry devices include keypads and proximity, magnetic strip or biometric readers. Once the information provided by the entry device is verified by the control module an electrical or electronic signal is transmitted to power controlled door locks, allowing entry. The stand alone systems may also include exit control devices, such as request to exit (REX) systems, door open status detectors, movement or occupancy sensors and local door alarm output and may hard wired connections, wireless communication arrangements or a combination thereof.

With reference to FIG. 1, a host based, real time security system 100 comprises application software, one or more a controllers 104, and one or more user identification entry devices 106. The application software resides on a host computer 102, such as a server located at a host site, that is in electronic communication with the controller at the protected site. The application software provides user interfaces with the controller to provide access data parameters, alarm monitoring and output control. Other functions that can be provided by the application software include photo badging, video display and management, graphical alarm displays, visitor control, etc. The data is sent from the host to the controllers via the controller communication network 108. The controller or controllers 104 are installed adjacent to or in the vicinity of the access point being controlled, such an entry latching mechanism 109, where it is further connected to the data input device, such as a card reader or other means to identify the user. The controller has limited intelligence and is configured to make and execute decisions based upon user access information previously supplied to the system. The user provides the appropriate access information to data reader 102 at the entry point which transmits the user identification information to the controller 104 for an access authorization decision. Based on authorization parameters of the cardholder within the controller 104, access is granted or denied and access management processed accordingly.

Referring to FIG. 2 a host system is shown with a master controller 110 and two sub controllers 112. The master controller 110 is an intelligent controller with database information necessary for the system to make access and security decisions for the sub controllers 112. Each sub controller 112 is connected to user ID and entry control devices 106 such as a card reader, door lock control, request to exit, door status and other input and output controls connected directly to the sub controller 112. The user's entry data fed to the entry control device 106 is transmitted to the sub-controller 112. The identification information is than re-transmitted from the sub-controller to the master controller 110 for an access authorization decision. Based upon authorization parameters within the master controller 110 instructions regarding access grant or denial is sent from the master controller to the sub-controller 112 which then implements the instructions regarding entry.

In either architecture, the Host system disseminates access control, door management, alarm monitoring, sense input monitoring, and output control parameters to the various controllers via a secured communication network.

Although current systems are popular and extensively used a major deficient of these systems is that a failure in communication between system components, or a failure of either the master controller 110 or a sub-controller 112 translates to a failure of the system with respect to the components controlled by the failed controller. The failure of a master controller 110 is a single point of failure in the system, resulting in a failure of all sub-controllers 112 assigned to the failed master controller. A need in the industry exists for a fault tolerant security system architecture that eliminates the denial of access as a result of a single point of failure. A further need exists for a system which is configured to automatically recover from a failure. A still further need exists for a security system with redundancy so that when there is a single failure in the system a non-failed controller can automatically assume the tasks of a failed controller.

BRIEF DESCRIPTION OF THE DRAWINGS

The detailed description of embodiments of the invention is made with reference to the accompanying drawings. Like numbers in the different figures represent corresponding parts.

SUMMARY

Figure 1:
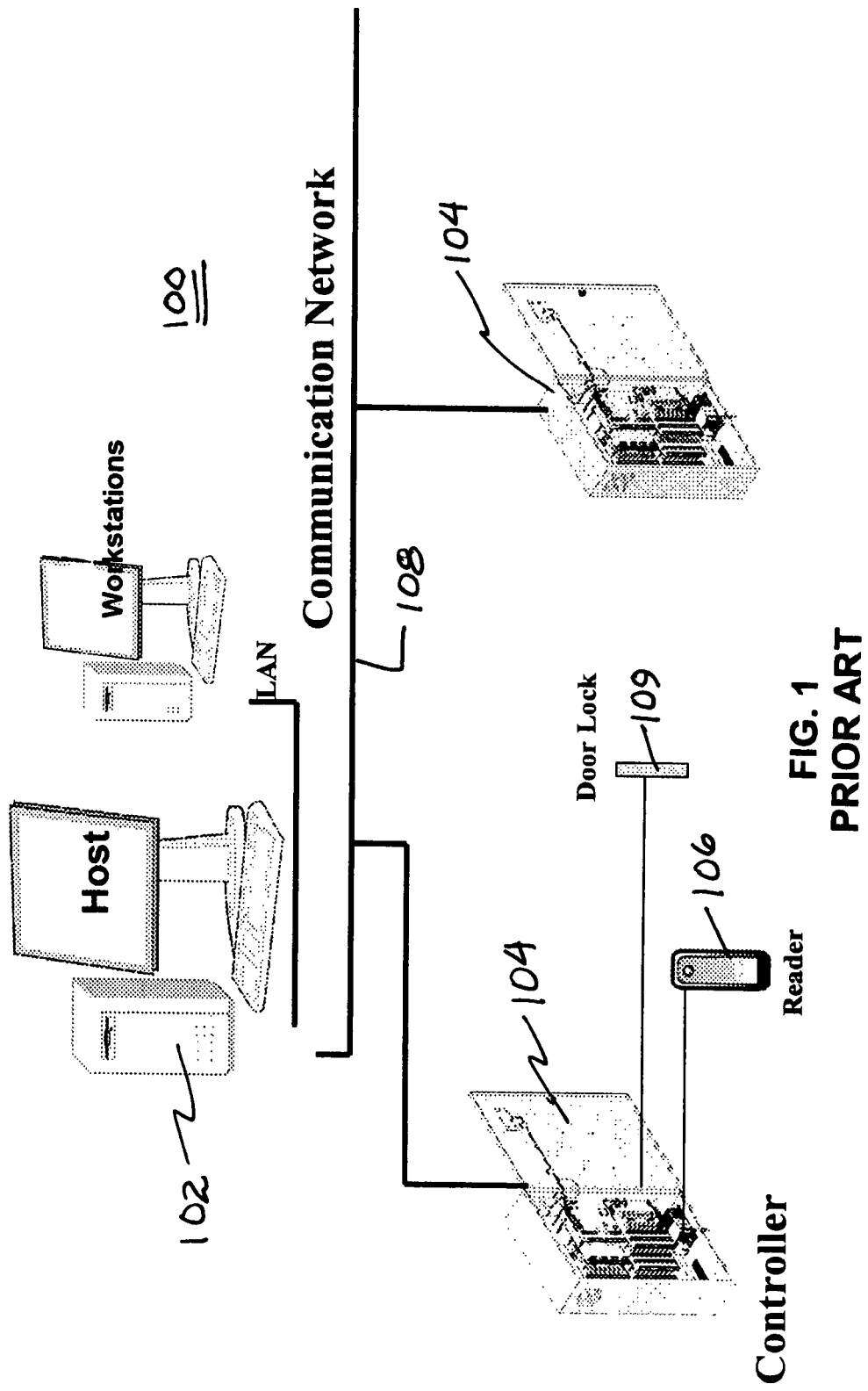
FIG. 1 is a schematic diagram showing a real-time, online host based system utilizing controller based architecture.
Figure 2:
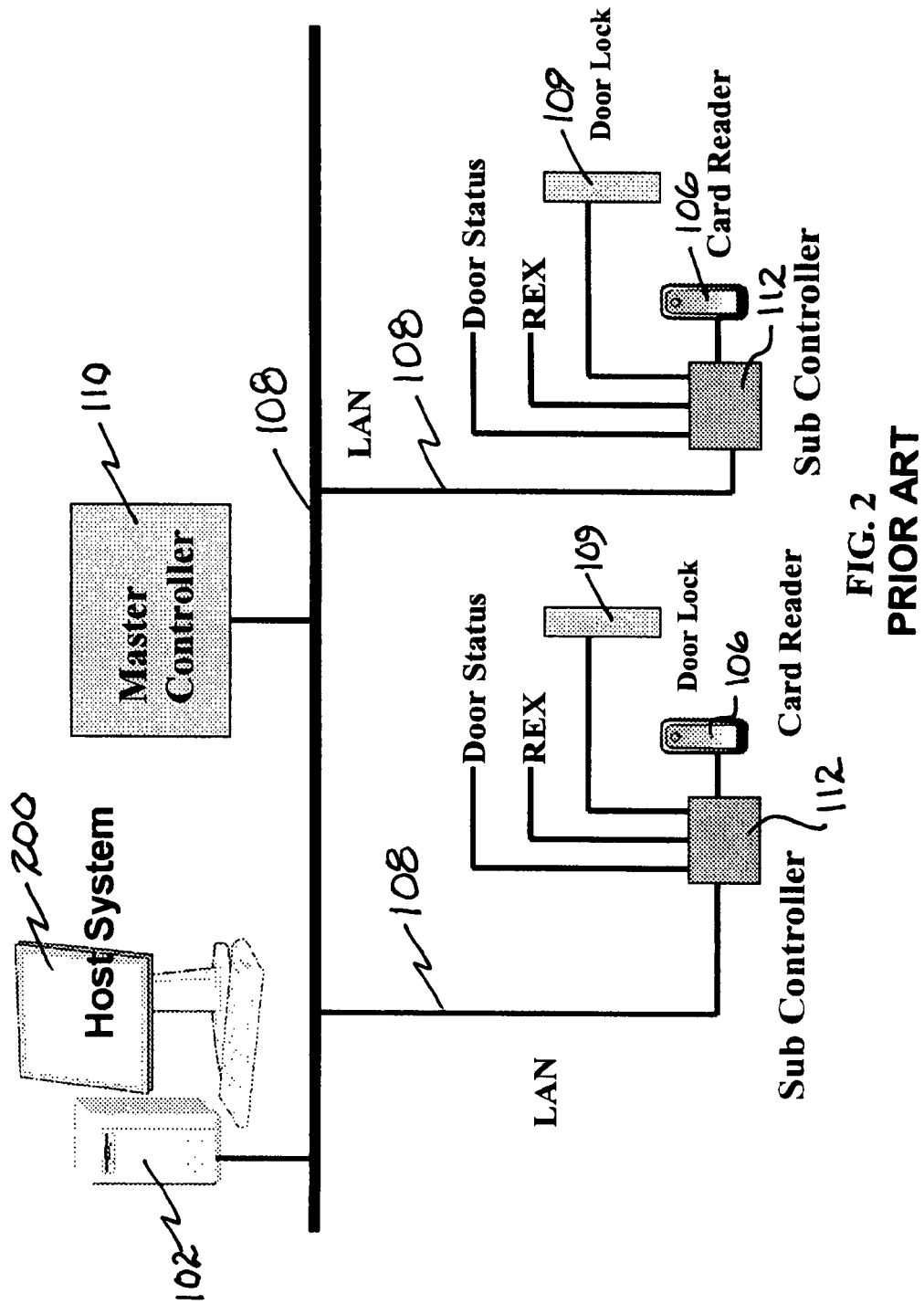
FIG. 2 is a schematic diagram showing a real-time, online host based system utilizing a master controller and sub-controller based architecture.

A security system comprises a host, a plurality of master controllers and a plurality of sub-controllers wherein each sub-controller is assigned a primary master controller and alternate master controller(s). The host, master controllers and sub-controllers are coupled by a primary communication network with alternate communication paths available for rerouting of the control signals The host system includes application software for access control and security monitoring. The host system also includes a data base along with database management software, communications drivers for user interface for use by the master and sub-controllers. The components of the system are configured and interconnected so that component failures and communication failures will not result in a system shutdown, authorized access is not denied and security is not be compromised.

The system includes multiple master controllers with each master controller configured to assume the duties of the other master controllers in the event of a failure of a particular master controller. An advantage to this feature is that a failure of one component in the system will not shut down the system and a single point failure in the system is not critical to the functioning of the system as a whole.

Another feature of is that each master controller and sub-controller incorporates a plurality of communication ports. An advantage to this feature is that a failure in one communication port will not cause the failure of the controller.

A still further feature of the system is that the security system is configured to automatically route and dynamically alter the communication path between two system components if a communication path fails in one of the components. An advantage to this feature is that the system can continue operation regardless of the communication path failure.

Still further, the system is configured to incorporate unlimited alternative master controllers or a designated master controller can assume the responsibilities of the host system upon the failure of the host system so that security integrity can be. maintained even if a substantial number of master controllers fail. The master controllers do not rely on the host for any security decision. All decisions are made by the master controller utilizing programmed data parameters sent from the host. The system also allows for the incorporation of a redundant host system so that the duties of the primary host can be transferred to the redundant host if the primary host fails.

The above and other advantages of will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

DETAILED DESCRIPTION

Embodiments of the invention are directed to a fault tolerant security system for controlling access to an entry point, such as a door to a building or office or secured spaces within a building. Preferred embodiments of the invention operate on a communication network, such as, for example, a local area network ("LAN"), an Ethernet, a wireless network and wireless LAN (WiFi network). The fault tolerant system is configured to operate on a communication network comprising both a primary communication network and alternate communication networks. The alternate communication networks are incorporated into the system in the event that the primary communication network or a portion of the primary communication network fails. In preferred embodiments, a priority order is established for the alternate communication networks such that a secondary, tertiary or quaternary path is pre-established in the event of a failure of one or more communication ports.

Figure 3:
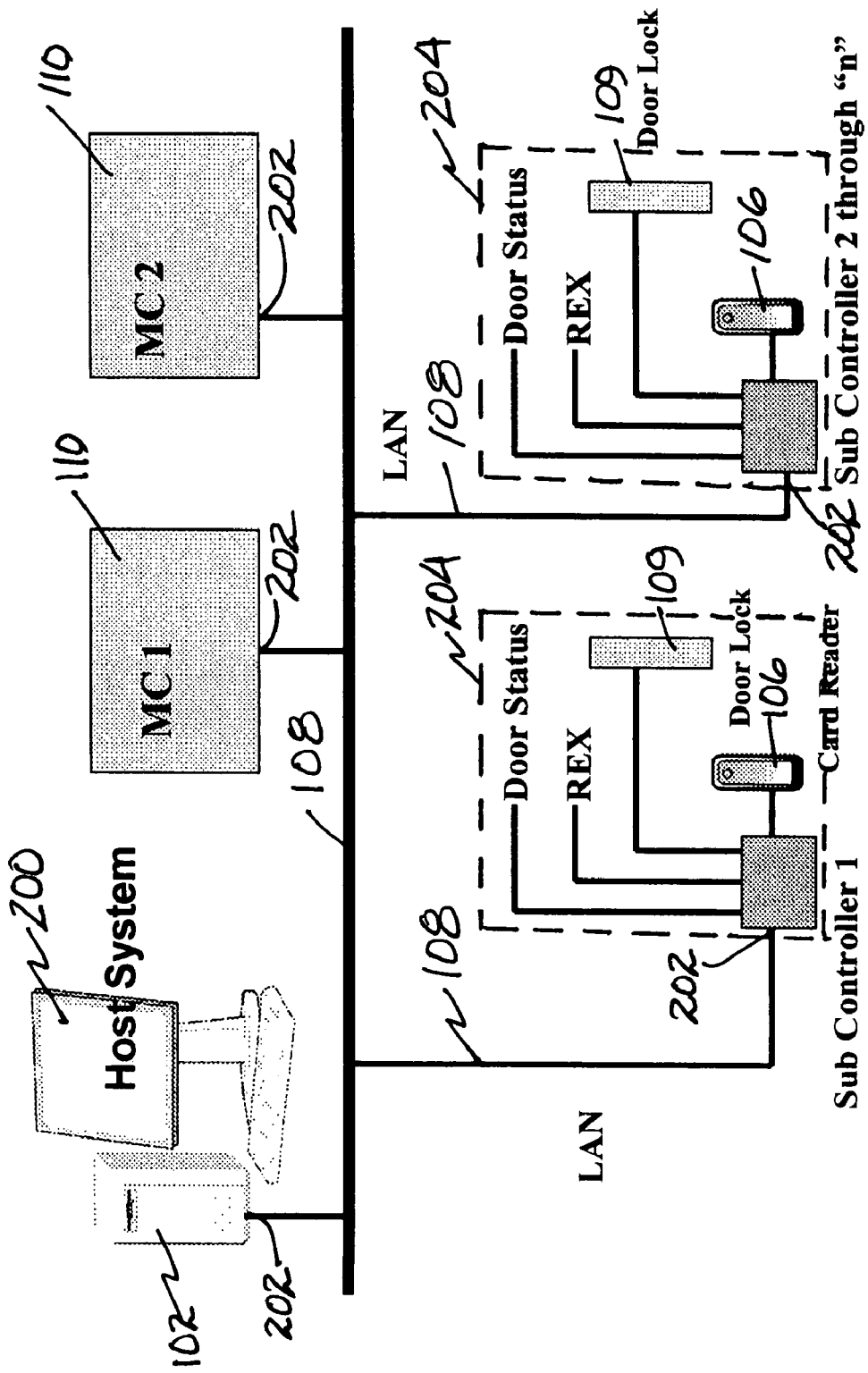
FIG. 3 is a schematic of a fault tolerant security system including multiple master controllers and multiple sub-controllers incorporating features of the invention.

With reference to FIG. 3, embodiments of the fault tolerant system comprise a host system 200 having a plurality of master controllers 110, a plurality of sub-controllers 112 and access control devices 204, which includes user identification entry devices 106 and entry latching mechanisms 109, where the host system 200, master controllers 110 and sub-controllers 112 are coupled together on the communication network 108. The host system 200, or server, may comprise any suitable network device capable of providing data and programs for communication over the network.

In preferred embodiments, the host system 200 includes a plurality of communication ports, wherein each communication port is configured to incorporate and transmit communications via various communication modalities. For example, in some preferred embodiments, the communication ports 202 include, but are not limited to, ports that can be configured to support a public network, such as the Internet, a local area network, or any other suitable communications connection, hardwired, wireless devices, ZigBee compatible systems (ZigBee is a high level communication protocol using small, low-power digital radios based on the IEEE 802.15.4 standard for wireless personal area networks (WPANs)), a wireless LAN, an Ethernet, or a hybrid thereof.

In preferred embodiments, the host system 200 is controlled by application software installed in the host computer 102 to provide data and programs to the master controllers 110 and comprises a programmable processor capable of operating in accordance with the application software stored on one or more computer readable media (for example, but not limited to, floppy disks, hard disks, random access memory RAM, CD-ROM), to provide data and programs for communication to the master controllers 110. The host system 200 can comprise, for example, but is not limited to, a personal computer, a mainframe computer, network computer, and portable computer, or the like.

The host system 200 further comprises a memory storage device, which may include one or more internal data storage devices for storing data and programs for communication to the master controller 110. Alternatively, or in addition, the host system 200 may be coupled to an external data storage device (not shown), computer or other means from which the host system 200 may obtain data and programs for communication to the master controllers 110.

The plurality of master controllers 202 are coupled to the host system 200 via the communication network 108. The master controllers 110 are hardware devices that interface between the host system 200, and the sub-controllers 112 and access control devices 204. The master controller 110 can include any suitable hardware device, including, but not limited to, a single board computer or multiple board computer with embed application software.

The master controllers 110 each have various components necessary for their operation including controller applications, a plurality of communication ports 202 (for simplicity only one communication port 202 is shown) and data storage means. The controller applications comprise a set of software logic configured to make and execute the decisions for the sub-controller 112 and ultimately, for the access control device 204 coupled to the master controller 110 via the sub-controller 112. Further, the controller application is preferably configured to conduct periodic self-check tests to verify the functional status of the master controller 110 and the status of the currently operating communication port and may also include testing protocols to periodically check the functional status of other components in the system which are in communication with the master controller 110.

The controller applications determine the access privileges for each authorized user and an access control feature, an alarm monitoring feature and an output control feature related thereto. Each feature can operate independently, but can also be integrated via software to interact with each other.

The access control feature determines whether the user requesting access will be granted access based on many different parameters and conditions. For example, access can be controlled by whether the user information presented to the system is valid or current, the time of day, the day, the site, the entry point within the site, whether an escort or supervisor is required, and the number of access attempts with the specific information. In addition, the system is capable of triggering events through the use of card access or by time controls to alter the normal decision making logic of the controller. If the system detects an alarm, it also has the ability to deny access to what normally would have been a granted access decision.

In addition to controlling access, the access control feature is further can be configured to determine the amount of time to allow access. For instance, in preferred embodiments, a preset amount of time is assigned to each user. If the user exceeds this amount of time, an alarm can be triggered or a message generated to identify an open entry point, e.g., a door left open message. If a user requires additional time to pass through the entry due to a physical handicap, or job to be performed (for example, the cleaning crew), a longer access time can be associated with the user information such that no message or alarm is triggered if the entry, for example, the door, remains open longer than the standard amount of time.

Further, in preferred embodiments, the access control feature is configured to transmit instructions to the access control device 204 in response to a predefined event. An event is a condition that causes the execution of predefined instructions in the system. An event can be caused by a card use, a sensor input or by time limitations. An example of a sensor input is a signal from a supplemental device that is configured to detect an interior or exterior condition such as abnormal temperature, pressure or humidity conditions or fluctuations, the presence of smoke, unusual noise, and unexpected motion in the secured area, these examples of events being presented for illustrative purposes only. For example if a smoke detector is being monitored by the access control system, the presence of smoke is an event which creates a parameter for the access controller to deny access to anyone trying to gain access through the card reader controlled doorway or allow access to special personnel otherwise denied access, such as fire fighting personnel.

Sensor inputs can be defined as alarm inputs, in which event one or more of the controllers will monitor the input to determine if a normal or alarm condition exists. The output signal from an access controller can be automatically energized (turned off or on) by alarm inputs, user commands, controller or access card transactions or by a specific time being reached.

Each of the various communication ports 202 in the system can be configured to incorporate and transmit communications via various different communication modalities. The plurality of communication ports 202, in preferred embodiments, will encompass the types of communication ports compatible with the communication ports 202 in the host system 200, but may include different types of communication ports as well. For example, in some preferred embodiments the communication ports 202 include, but are not limited to, ports that can be configured to support a public network, such as the Internet, a local area network, or any other suitable communications connection, hardwired, wireless (such as a ZigBee system), a wireless LAN, an Ethernet, or a hybrid thereof.

The primary data storage means is any memory device in the host system capable of storing the data and programs, including, but not limited to, an internal memory, an external device, or any combination thereof necessary to operate the system. In preferred embodiments, the storage means is of sufficient size to store all of the data and programs required by the host system.

The sub-controllers 112 each include application software to maintain the requirements of that sub-controller 112. Multiple sub-controllers are used primarily to handle various applications for door access, alarm monitoring, input sensing, (temperature, pressure, humidity, etc.) output control (turning on or off devices, elevator control, etc.) etc. Similar to the master controller 110, the sub controller system 112 software incorporates application, communication and diagnostic software. Each sub-controller 112 has a plurality of communication ports 202, with each communication port 202 configured to incorporate and transmit communications via various communication modalities. The plurality of communication ports 202, in preferred embodiments, will encompass the types of communication ports included in the host system 200 and master controller 110, but may include different types of communication ports as well. For example, in some preferred embodiments the communication ports 202 include, but are not limited to, ports that can be configured to support the same communications, such as a public network, such as the Internet, a local area network, or any other suitable communications connection, hardwired, wireless, a wireless LAN, an Ethernet, or a hybrid thereof.

Each sub-controller 202 also has data storage means (memory devices) capable of storing data and programs necessary for the operation of the specific sub-controller 112 and related access control device 204. The sub-controller memory device can be any suitable system including but not limited to an internal memory, an external device, or any combination thereof.

The access control is provided by a combination of devices that directly execute the decisions to allow or deny access to the entry point associated with the access control device 204. The access control device 204 comprises user identification entry devices 106, also referred to as a reader. The reader 106 is any type of suitable interface hardware that is configured to receive a predefined set of user data. In preferred embodiments, suitable readers 106 utilize technologies that include, but are not limited to, readers for access cards containing magnetic strips or bar codes, proximity or smart card readers, cards containing RF chips, sometimes referred to as DES-Fire devices, and systems to receive biometric input. Biometric readers can include, but are not limited to, devices that can perform an eye retina scan, read a palm print, finger vein pattern or finger print, or recognize hand geometry or facial or voice characteristics. These biometric parameters are unique to each individual and present user specific patterns that can be used to distinguish between individuals. The readers 106 are configured to receive the unique user-specific information and transmit the information directly to the master controller 110, or the sub-controller 112 and then to the master controller 110, to determine whether the requesting user is authorized.

An access card is a portable device, preferably made from a soft plastic; however, any material that can be passed through a reader can be used. The card is configured to contain unique user identifiers, and in some preferred embodiments can also contain a visual identification of the user such as a photograph of the user embossed, printed or otherwise affixed to the surface of the card. The card is presented to the reader for authorization. In preferred embodiments, the card can be waived in front of the reader, swiped across the reader or passed through a slider on the reader 106 so that the reader can read information embedded in or on the card. The reader and card combination are commonly devices used in various different security and financial transactions. While certain types of devices and user identification techniques are described herein the system described is not limited to these devices. The scope of the invention is intended to include presently available and future developed means and techniques which can be used to uniquely identify and distinguish between individuals desiring to be identified by the access system.

In operation, the host system 200 transmits all of the data and programs stored in the storage device to the memory devices in each of the master controllers 110. Each master controller 110 has at least one sub-controller 112 to which it is communications for control and operation of the access control devices 204 connected to that sub-controller. Each master controller 110 has at least one sub-controller 112 assigned to it and that sub-controller has at least one access control devices 204 assigned to it. A master controller 110 can also be assigned as an alternate to another master controller (i.e., a back up for another master controller 110) and as the master controller 110 or alternate master controller to one or more sub-controllers 112. The master controllers 110 utilize the data and programs to make decisions with respect to access control, alarm monitoring and an output control features or functions that are activated by authorized individuals accessing the secured area. Besides authorizing entry, output control features or functions can include other actions that can be controlled by an authorized individual, for example, also turning a light on when access is authorized turning of the lights following a pre-specified time interval.

The host 200, master controllers 110 and sub-controllers 112 are all configured to communicate via a primary communication network, such as, a LAN. The host 200 and each of the master controllers 110 and sub-controllers 112 are programmed to perform periodic self-checks and advise other components of its status and its communication status. The periodic self-check is designed to determine whether the component, including its communication ports, is fully operational.

In preferred embodiments, the host 200 transmits its status to each of the master controllers 110 and, in turn, each master controller 110 transmits its status to the host 200 as well as the other master controllers 110. If a particular master controller 110 fails to transmit its status, the host system 200 as well as the other master controllers 110 will identify the failure in the transaction log. The host system 200 can then send a command to an alternate master controller 110 to subsume the duties of the failed master controller 110. In a more preferred configuration since the master controllers 110 and the host 200 are always in communication with each other, failure of one master controller 110 or the host 200 or any communication link is immediately sensed by the other master controllers 110 and another master controller 110 automatically takes over. The host 200 is not needed for the backup master controller 110 to take over the tasks of the failed link in the system. In some preferred embodiments, a hierarchical order is preset for the master controllers 110 so that a failure to transmit the results of the status check by a particular master controller 110 causes the alternate master controller 110 next in line to automatically assume the duties of the failed or non-responsive master controller 110.

The sub-controllers 112 also conduct periodic self checks to verify proper operations of application and system activity, including information regarding the communication port 202 being utilized to communicate with its assigned master controller. If the sub-controller 112 looses communication to its assigned master controller 110 it will, after executing a communication recovery logic, automatically establish communication with an assigned alternate master controller 110. The communication recovery logic will continue until a valid alternate master controller 110 is found. The establishment of communication with an alternate master controller 110 is then transmitted to the host 200 and the transaction is logged. The sub controller communication recovery logic can also include communication retries, search for an alternate communication path such as a wireless connection and the search for an alternate master controllers.

Figure 4:
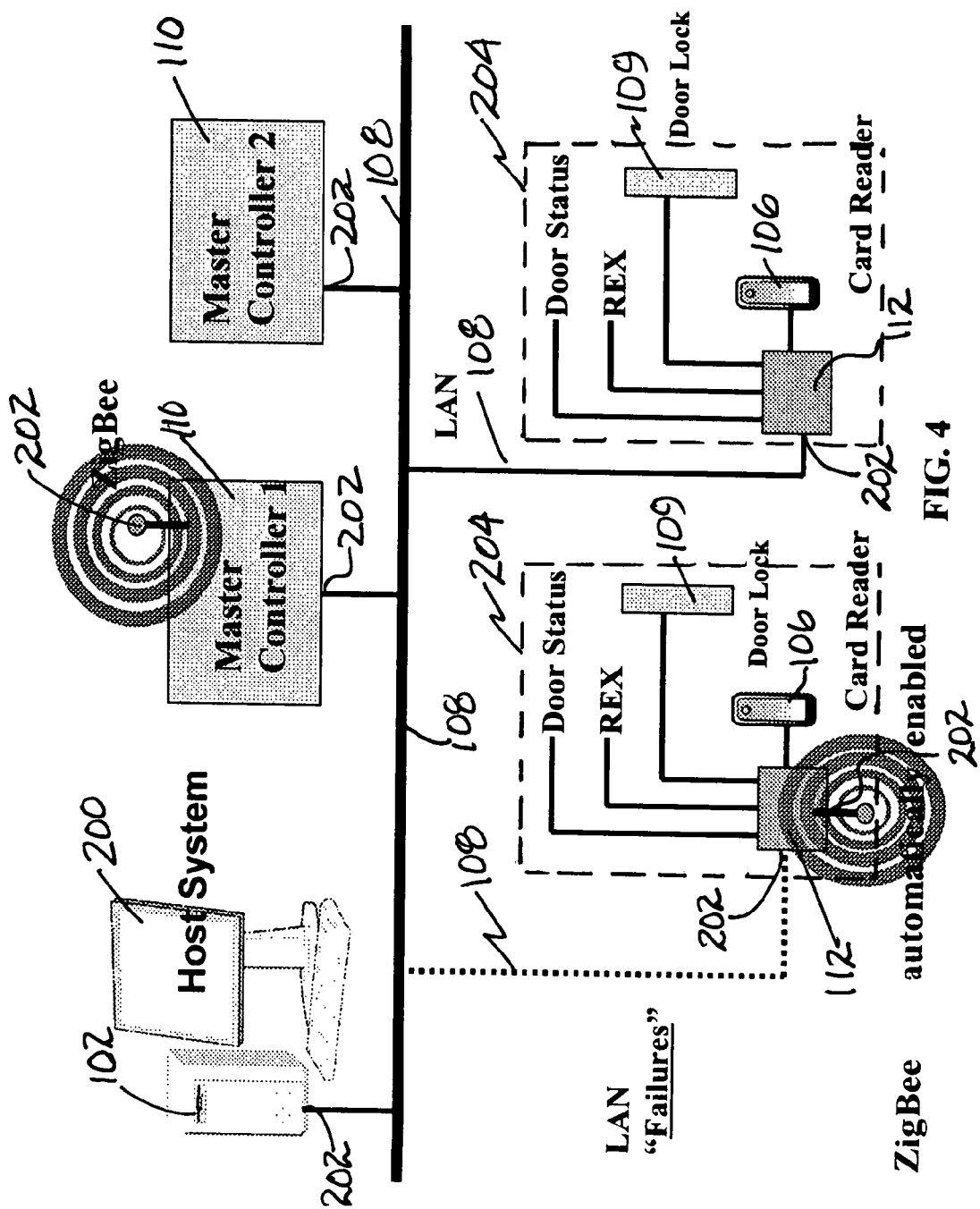
FIG. 4 is a schematic diagram of the system in accordance with the embodiment of FIG. 3 wherein communication is redirected to an alternate port upon failure of a primary communication port.

The master controllers 110 and sub-controllers 112 maintain communication with one another by transmitting predefined data or status messages. A communication failure is deemed to exist when these predefined message are not received within a prescribed timeframe. The master controller 110 or sub-controller 112 will then try to reestablish communication through their assigned communication recovery logic. With reference to FIG. 4, should the primary communication path fail for one of the components, such as one of the sub-controllers 112, the master controller 110 associated with the failed sub-controller 112 automatically activates a secondary communication port 202 to open a secondary communication path to the sub-controller 112 that had the communications interruption. If the secondary communication port 202 fails, communication through tertiary and quaternary ports are respectively attempted until communication between the master controller 110 and sub-controller 112 can be re-established. The remaining components, that is, the host 200, and other master controllers 110 and associated sub-controllers 112 remain operating on the primary communication path, and only the communication path between the first master controller 110 and associated sub-controller 112 is changed. In addition, when the primary communication port 202 for the first sub-controller 112 fails, a failure notice is transmitted to the host system 200 to alert personnel of the failure. Once the failure is corrected, the primary communication path will be reinstated between the first master controller 110 and first sub-controller 112. It is to be understood that some or all of the primary communication paths could fail. In such an instance, the secondary communication paths are engaged for each of the component pairs experiencing the failure, or for the entire system. Once the failure is corrected, the primary communication paths are reinstated. However, because the system includes multiple redundancies none of these operational or communication failures will result in a point failure (a shut down of a particular access control devices 204) or an entire system failure occur.

Figure 5:
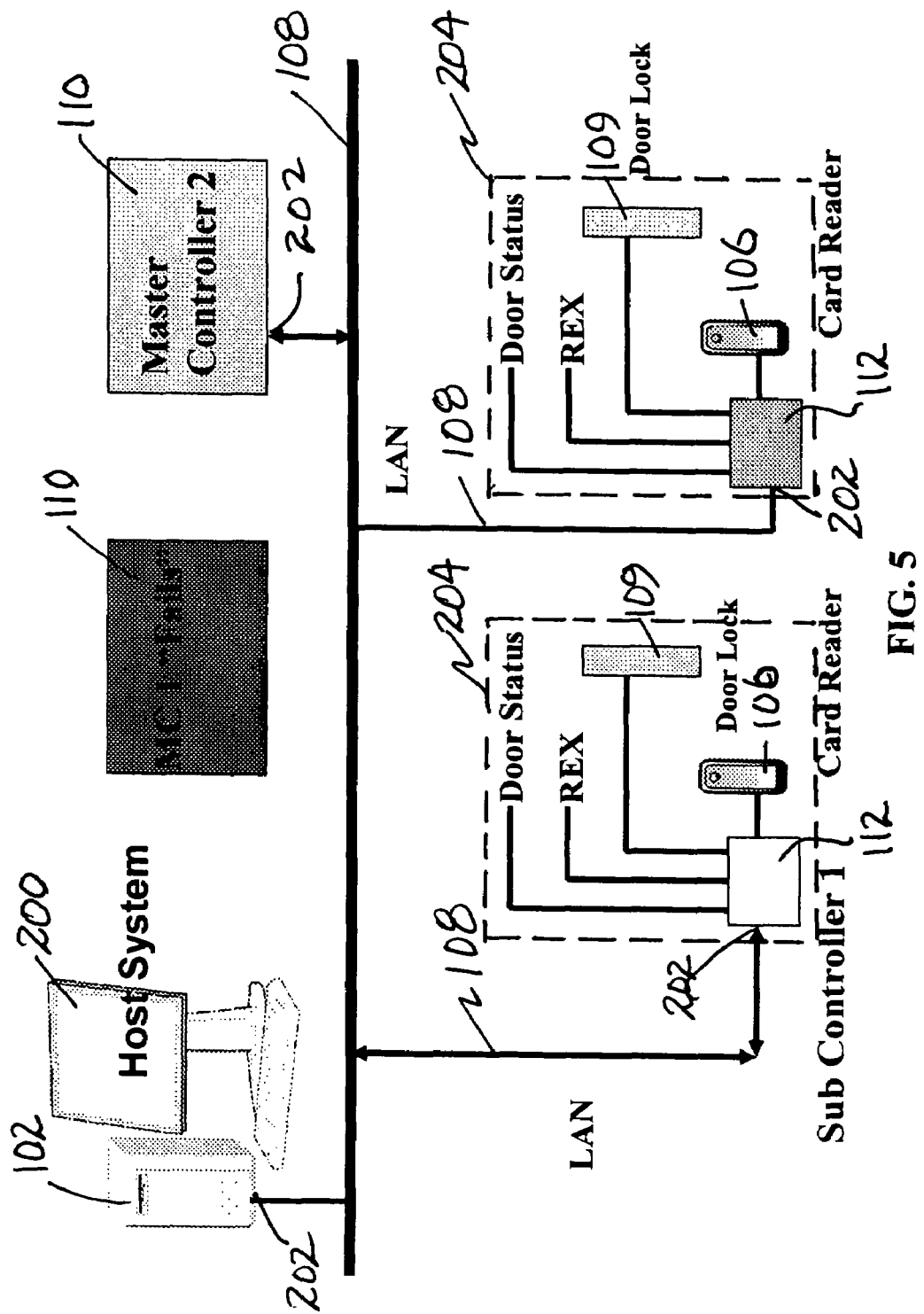
FIG. 5 is a schematic diagram of the embodiment of FIG. 3, with the monitoring and control of a sub-controller is transferred to an alternate master controller following failure of the sub-controller's primary master controller.

In addition to a communication path failing, as indicated above, a master controller 110 can fail. With reference to FIG. 5, in the event that a first master controller 110 fails, the command and control of the first sub-controller 112 is rerouted to a second master controller 110. Since the storage devices for each master controller 110 contains a copy of all data and programs, including, but not limited to, parameters, configurations, tables, and status for every sub-controller 112, the substituting second master controller 110 can simply assume the duties of the first master controller 110 without interruption of the operation of the system, thus reducing or eliminating possible points of failure due to a component failure or power failure.

Figure 6:
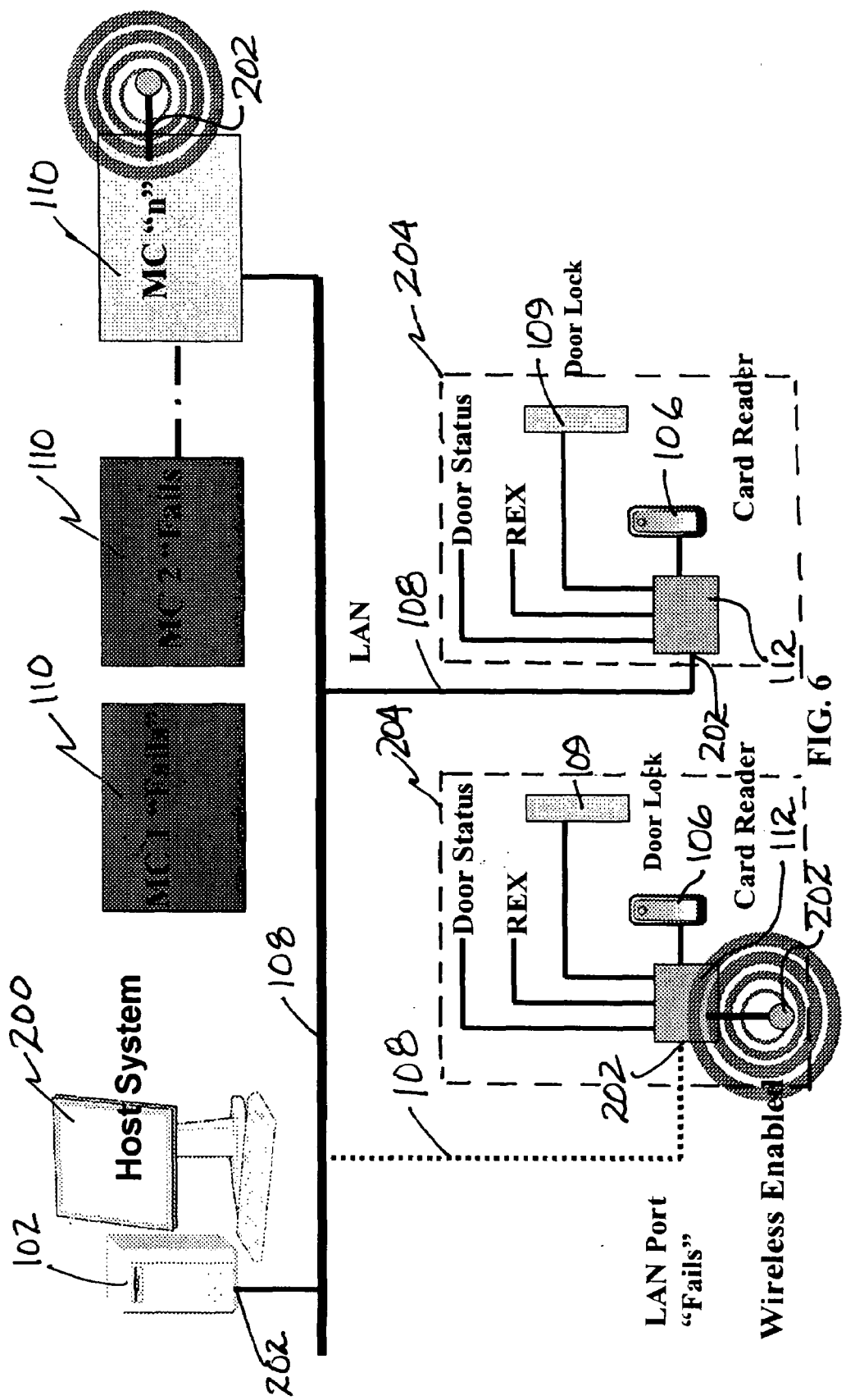
FIG. 6 is a schematic diagram of an embodiment of the fault tolerant system having multiple master controllers, with a failure of several of master the controllers and the primary communication port of one of the sub-controller's, with communication routed automatically to an alternate communication port.

The fault tolerant system incorporating features of the invention is designed to accommodate any type of failure, including a combination of failures due to component failure and communication path failure. As represented by FIG. 6, in the case of all master controllers 110 failing except for an $n^{th}$ master controller the duties of all of the sub-controllers 112 are assumed by the $n^{th}$ master controller 110. However, in this example, the $n^{th}$ master controller 110 has also dynamically re-rerouted the communication path to the first sub-controller 112 due to the primary communication path failing for the first sub-controller 112. As a result, in this instance, the $n^{th}$ master controller 110 operates using two communication paths. The primary communication path, such as, LAN, is engaged for the second or additional sub-controllers 112, and the secondary communication path, such as a wireless communication arrangement, is engaged for the first sub-controller 112. If any other components experience failure with the primary communication path, the $n^{th}$ master controller 110 automatically re-routes communications to the next operative communication path. Once the primary communication path is reestablished, the first sub-controller 112, the second sub-controller 112 and $n^{th}$ master controller 110 will reengage the primary communication path. Similarly, when the 1 through $n^{th}$ master controllers 110 are reestablished, the duties of each master controller 110 will be transferred from the $n^{th}$ master controller 110 to the originally assigned master controller 110.

Figure 7:
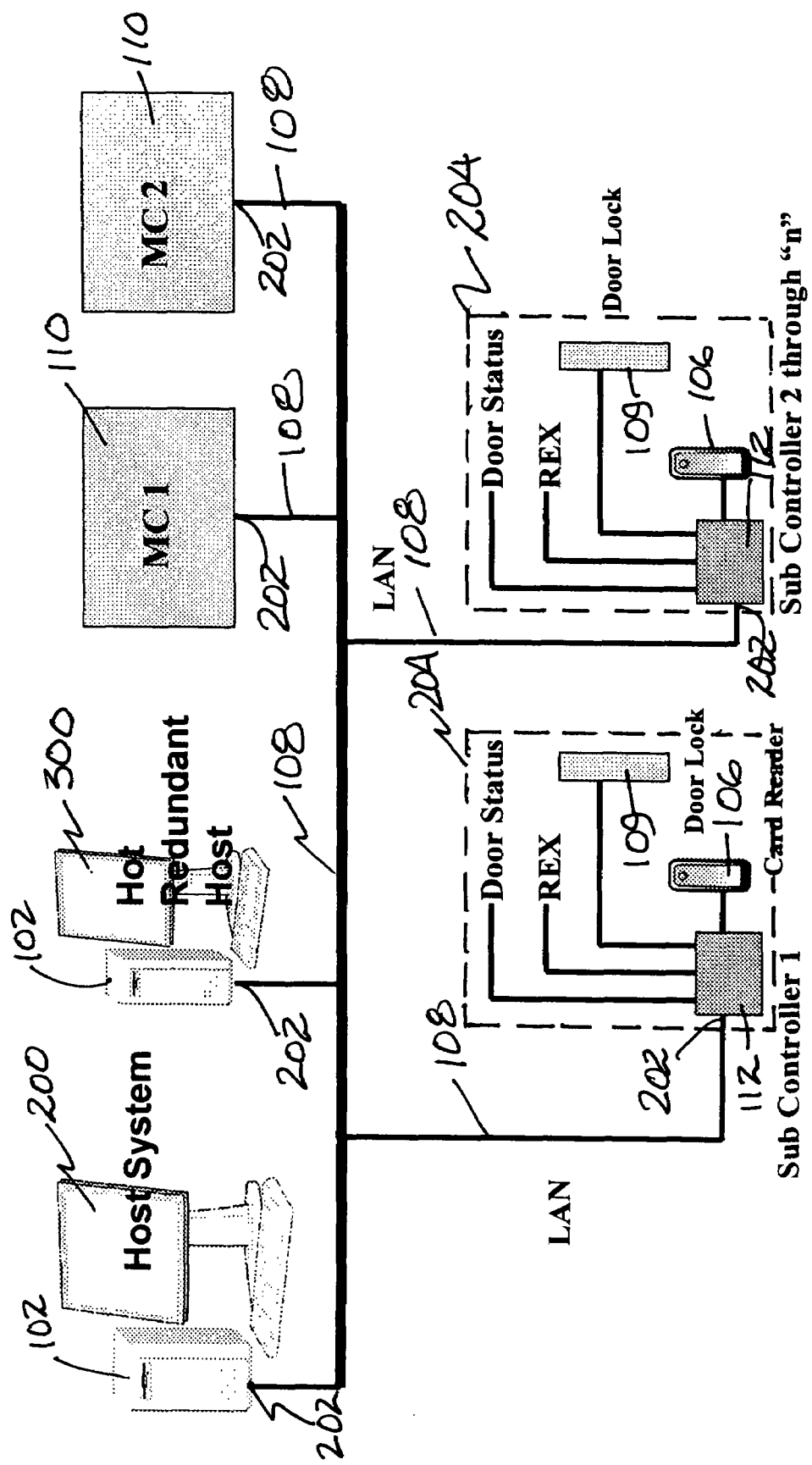
FIG. 7 is a schematic diagram showing an embodiment of the fault tolerant system with a redundant host system.

In some preferred embodiments, the fault tolerant system may also comprise a redundant (second) host system 300. With reference to FIG. 7, a redundant host 300 is coupled to the system in the event that the primary host system 200 fails. Similar to the master controllers 110, the redundant host 300 stores all of the data and programs for the security system such that it can automatically assume the duties of the primary host system 200 without interruption of the operation of the system. The redundant host 300 is similar to the primary host system 200 and operates in the same manner as set forth above.

The host, master and sub controllers are separate and distinct components and have different intended primary functions. The host is the system administration device. It is used as the man machine interface to program the master and sub controllers. It also incorporates other application such as transaction logging and reporting. The master controller is the decision maker for the security system. It uses parameters created by the end user to make security decisions for access control, alarm monitoring and output control. The sub controller functions as a door interface module (DIM). It is the hardware interface connected to the access control devices 204 and monitors and controls the door status as well as additional sensor inputs and output.

Although the preferred embodiments have been described with a particular configurations, it is to be understood that embodiments of the invention can be configured to include any number of additional or alternative cooperative components, or any type of components configured to assume the duties or alternate duties necessary to keep the security system operative The disclosure is intended to include other embodiments encompassing other configurations of the system with in the scope of the teachings herein. For example, the system can be configured so that a sub-controller can be alternatively designated as a master controller on the failure of all the master controllers. Further, the system can be configured so that a sub-controller can have multiple access control devices attached thereto or and access control device can be in communication with multiple sub-controllers. As such, the foregoing is intended to cover all modifications and alternative constructions falling within the spirit and scope of the invention.

I claim:

1. A security system, comprising:
    a host system, the host system comprising:
        application software;
        a plurality of communication ports; and
        a storage database containing access and security information;
    a plurality of master controllers, each master controller having a plurality of communication ports; and
    a plurality of sub-controllers, each sub-controller comprising a plurality of communication ports, each sub-controller being assigned to a specific master controller and having designated alternate master controllers assigned for backup communication;
    the host system, plurality of master controllers and sub-controllers all being coupled by a network in communication with the communication ports;
    wherein the plurality of master controllers comprise a first master controller and at least a second master controller;
    wherein the plurality of sub-controllers comprise a first sub-controller and at least a second sub-controller; and
    wherein the plurality of communication ports comprise a primary communication port and at least a secondary communication port on each of the master controllers and sub-controllers, wherein the first master controller is assigned to a first sub-controller and communicates with the first sub-controller via primary communication ports, and wherein the second master controller communicates with the second sub-controller via primary communication ports, and the primary and secondary communication ports are each configured to incorporate different communication modalities from the communication modalities of the primary communication ports, pre-selected secondary communication ports assuming communication between designated master controllers and sub-controllers upon the malfunction of a primary communication port; and
    the primary communication ports and the secondary communication ports are configured to incorporate a communication modality selected from the group consisting of a LAN, wireless, wireless LAN, and power over Ethernet.

2. The security system of claim 1, further comprising one or more additional host systems, wherein a secondary host system is configured to activate upon the failure of a primary host system or any of the one or more additional host systems.

3. The security system of claim 1 having multiple access control devices, wherein each sub-controller has one or more access control devices coupled thereto.

4. The security system of claim 1 further comprising an access control device, the access control device being associated with a pre-assigned sub-controller.

5. The security system of claim 4, wherein the access control device further comprises a reader configured to receive user provided identification information, the user provided identification information being compared to stored user provided identification information for access authorization.

6. The security system of claim 5 wherein the stored user provided identification information is resident in a memory portion of the host system, a master controller or a sub-controller in communication with the access control device.

7. The security system of claim 5 wherein the reader is configured to receive user identification information from a card inserted in the reader or in proximity of the reader.

8. The security system of claim 5 wherein the readers is configured to obtain user identification information from user provided cards selected from the group consisting of magnetic strip cards, bar code bearing cards, proximity cards, smart cards and RF cards, user carried signal generating devices, and biometric characteristics of the user ascertainable by the reader.

9. The security system of claim 1, wherein the each of the master controllers and sub-controllers comprise:
   access management software; and
   a memory storage device containing at least that portion of the access and security information stored in the host storage database required to operate access control devices which are in primary or backup communication therewith.

* * * * *